Patented July 31, 1923.

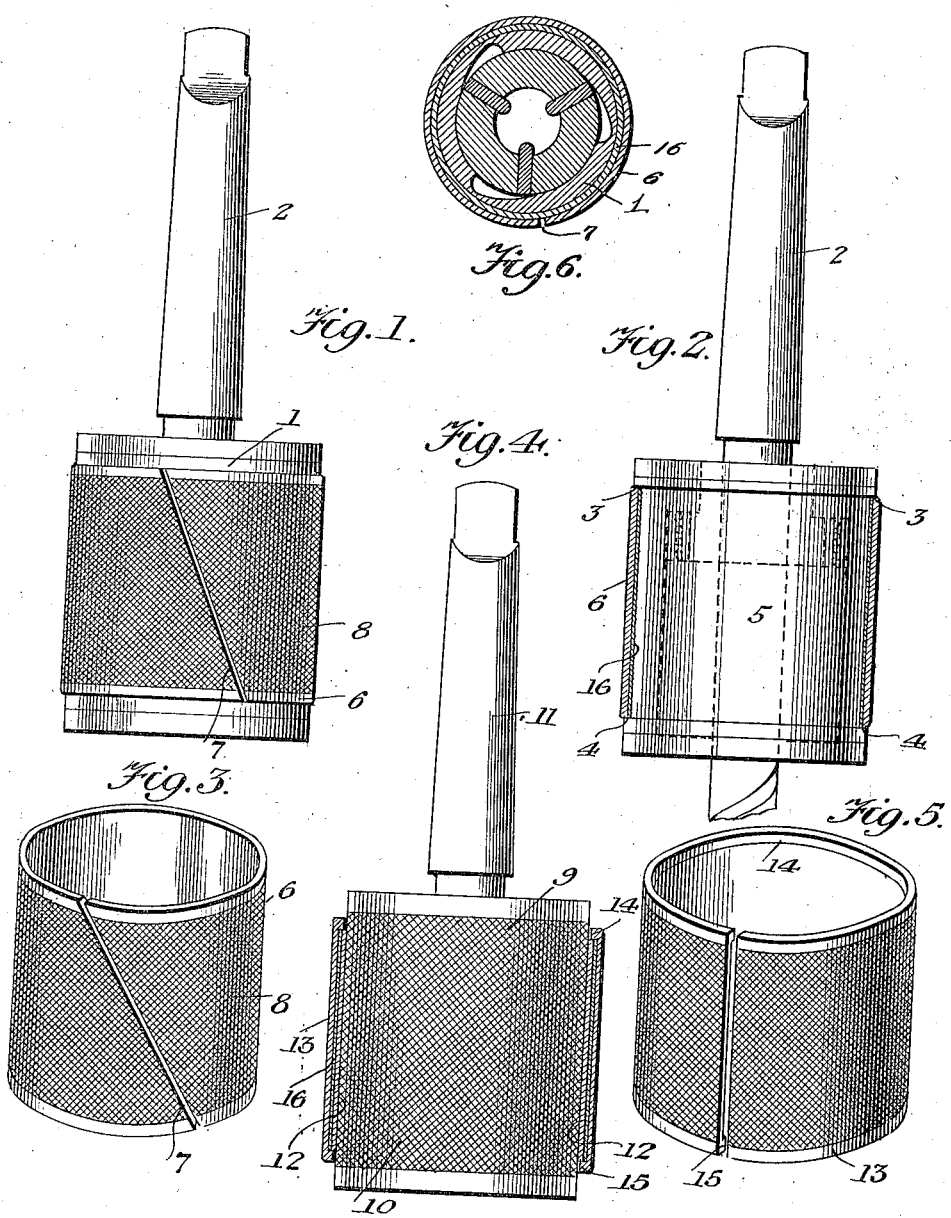

1,463,412

UNITED STATES PATENT OFFICE.

DENVER BROWN WELLER, OF WASHINGTON, DISTRICT OF COLUMBIA.

SAFETY APPLIANCE FOR DRILL CHUCKS.

Application filed March 21, 1918. Serial No. 223,766.

*To all whom it may concern:*

Be it known that I, DENVER BROWN WELLER, a citizen of the United States, residing at No. 3634 Warder Street NW., in the city of Washington and District of Columbia, have invented a new and useful Improvement in a Safety Appliance for Drill Chucks, of which the following is a specification.

This invention relates to certain new and useful improvements in drill chucks and deals more particularly with a safety device by which the chuck may be manipulated to open the jaws to release or insert a tool without interfering with the constant speed of the machine.

Heretofore, in drill chucks in which there is employed a plurality of radially movable jaws, there is also provided a sleeve member which encircles the jaws and the movement of the sleeve member, either rotary, reciprocating or combined rotary and reciprocating, causes by its peculiar interior construction, an inward or outward movement of the jaws. These sleeve members all have a limited range of movement in causing the jaws to open to release the tool and are usually provided with a spring means to return the sleeve to its normal or closing position. In use the chuck is associated with any suitable power mechanism to impart a rotary motion to the same and is usually revolved at the rate of 200 or 300 revolutions per minute. Should it become necessary to change the tool, for any reason whatsoever, the machine would have to be stopped to enable a safe and positive manipulation of the sleeve; this causes considerable valuable time to be lost and also a heavy wear and tear on the machine caused by this continual starting and stopping. In numerous cases it has been attempted to operate the chuck while the same is revolving at this high rate of speed and has resulted in serious injury to the operator, such as burning or tearing the flesh of his hand or in some cases breaking his arm. This happens because the sleeve member, when gripped while the chuck is rotated at high speed, is almost instantaneously moved through its limited range of movement and then continues to revolve with the chuck.

It is therefore broadly contemplated in the present invention, to provide a structure used in connection with the rotary chuck by which the sleeve member may not only be opened to the limit of its movement, but held in that position indefinitely while the machine is in constant operation, without incurring any of the aforesaid detrimental results.

Another object of the invention resides in the ability to either remove or insert a tool while the machine is in operation.

With these and other objects in view, not specifically mentioned, as will be apparent to those skilled in the art, I will now describe my invention in detail so as to enable the same to be made and used.

In the accompanying drawings, which are to be taken as a part of this specification, and in which I have shown merely preferred forms of embodiments of the invention, Figure 1 is a front elevation of a common type of drill chuck showing the safety gripping device attached thereto, Fig. 2 is a view, partly in section, showing the manner of associating the band with the chuck, Fig. 3 is a perspective view of the gripping member, as shown in Figs. 1 and 2, Fig. 4 is a modified form, partly in section, showing the manner of associating the band with a form of chuck now on the market, Fig. 5 is a perspective view of the band used in Fig. 4, and Fig. 6 is a transverse sectional view taken through the chuck illustrating the radially movable jaws.

As to the type of drill chuck shown in the drawings, it might be well to here state that it is known as the Wahlstrom chuck and I have only illustrated, for the sake of clearness, the outside appearance of the same, as I wish it understood that my device can be attached to any type in which there is employed radially movable jaws and a member encircling the same, the said member constituting an operating means for opening or closing the jaws by either an oscillatory, reciprocating or a combined oscillatory and reciprocating movement.

In the present case numeral 1 designates an oscillatory sleeve member within which is located the radially movable jaws and 2 indicates a shank by which the chuck is given rotary motion when attached to a drill press or other machine tool. The sleeve member 1 is provided with shoulders 3 and 4, adjacent the top and bottom thereof respectively, and the surface of the sleeve therebetween is preferably smooth as indicated at 5. Mounted upon the chuck between the shoulders 3 and 4 is a contractible band 6 which is split transversely, preferably on a diagonal, as at 7. This band 6 is provided with a milling as indicated at 8, by which the band may easily be gripped and held without danger of slipping.

In the modified form as shown in Figs. 4 and 5, the device can readily be attached to any of the above mentioned forms of chucks now on the market. As illustrated in Fig. 4, the sleeve member 9 is provided with the usual milling 10 and also with a shank 11 by which the chuck is attached to the drill press. In order to provide a smooth gripping surface on the sleeve member 9, there is attached thereon a smooth metallic band 12. The contractible band 13, in this structure, is provided with raised portions 14 and 15 adjacent its upper and lower ends respectively. When the band 13 is slipped over the smooth metallic band 12, the raised portions snap over the edges of the smooth band and thereby prevent the accidental removal of the former.

In case the contractible band, in any of the above mentioned forms, is made of similar metal to that of which the chuck is composed, there is provided a fibrous lining 16 to the interior of the contractible band, but when the metals are dissimilar there is no need of the lining.

In operation, when the chuck is provided with a tool and the chuck is being rotated, it sometimes requires a substitution of another tool and with this device attached to the chuck, this change may be made without stopping the machine, by simply grasping and applying hand pressure to the contractible band. This band in turn will then cause a frictional contact between the same and the smooth outer surface of the sleeve, with the result that the sleeve is retarded to the limit of its oscillatory movement, which causes the jaws to open and release the tool, the sleeve will then continue to rotate, slipping through the band but holding the jaws open as long as sufficient pressure is applied to the band. As soon as the desired tool has been inserted, the band is released and the chuck returns to its normal closed position, due to the spring return mechanism within the sleeve and secures the tool within the chuck.

The type of chuck selected to illustrate the invention, is but one of many possible forms to which the device may be attached, and therefore should not be restricted to the precise details of structure shown and described but is only to be limited by the scope of the appended claims.

What I claim is:

1. In a rotary chuck, the combination with movable jaws, of a means for actuating said jaws consisting of an oscillatory sleeve provided with shoulders adjacent its ends and a contractible band carried on said sleeve between the shoulders and having sufficient inherent contractile force to remain there and constituting a means when grasped for operating the sleeve and then permitting slippage of said sleeve while the chuck is constantly rotated.

2. In a rotary chuck, the combination with movable jaws, of a means for actuating said jaws consisting of an oscillatory sleeve and a transversely split band held to said sleeve by its inherent contractile force and constituting a means to be grasped and further contracted for operating the sleeve and then permitting slippage of said sleeve while the chuck is constantly rotated.

3. In a rotary chuck, the combination with movable jaws, of a relatively movable sleeve for actuating said jaws, and a hand gripping member interlocking with said sleeve to limit axial movement on the sleeve and adapted when grasped to momentarily check the rotation of said sleeve and then permit slippage of the sleeve while the chuck is constantly rotated.

In testimony whereof I affix my signature in the presence of two witnesses.

DENVER BROWN WELLER.

Witnesses:
WILLIAM M. HEINLINE,
W. W. CHASE.